G. C. CARSON.
CONSTRUCTION OF ROOFS OF OPEN HEARTH AND REVERBERATORY FURNACES.
APPLICATION FILED JUNE 26, 1915.
1,302,307. Patented Apr. 29, 1919.
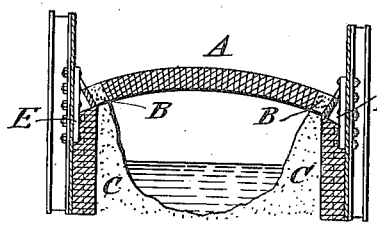
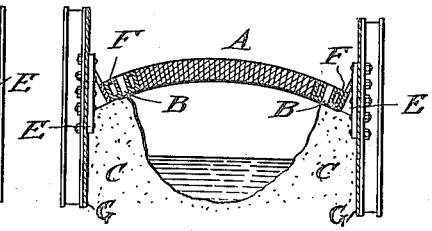
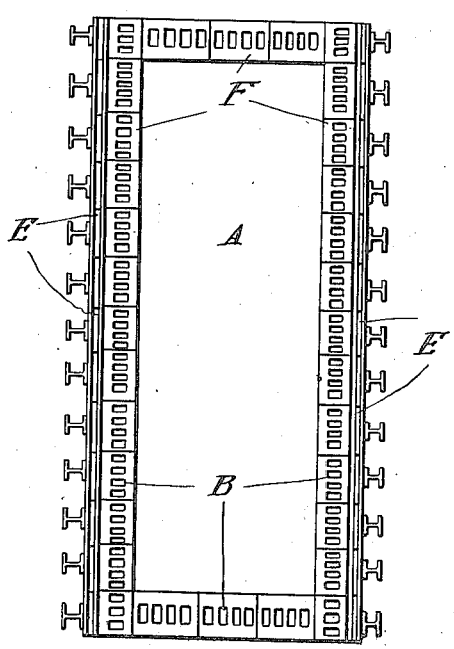
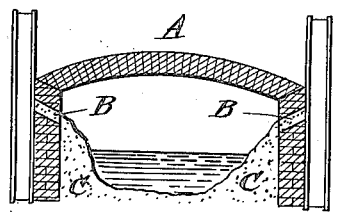

UNITED STATES PATENT OFFICE.

GEORGE CAMPBELL CARSON, OF SAN FRANCISCO, CALIFORNIA.

CONSTRUCTION OF ROOF OF OPEN-HEARTH AND REVERBERATORY FURNACES.

1,302,307.   Specification of Letters Patent.   Patented Apr. 29, 1919.

Original application filed January 15, 1907, Serial No. 352,468. Divided and this application filed June 26, 1915. Serial No. 36,496.

*To all whom it may concern:*

Be it known that I, GEORGE CAMPBELL CARSON, a citizen of the United States, who resides at 89 Broadway street, San Francisco, California, have invented a new and useful Improvement in the Construction of Roofs of Open-Hearth and Reverberatory Furnaces.

My invention relates to the construction of the roof and walls so that the material used to protect the walls of the furnace from the scorifying of the bath within the furnace is charged upon the furnace floor and along the furnace walls through ports that deliver it along the interior against the walls and prevents the bath of molten material from scorifying the interior of the furnace structure.

I support the roof of the furnace upon brackets which relieve the furnace walls from the burden of the roof and the stresses caused by expansion and contraction due to varying temperatures within the furnace.

When the material fed into the furnace is of such a nature as to flux the silica of the roof *i. e.* roll scale, iron ore, or other material used to produce steel, or calcines containing basic oxids I provide water cooled blocks for the ports or passages through which the material is fed into the furnace thus preventing it from coming into contact with the silica in the roof.

A great saving is made by leaving out all of the masonry of the side walls and allowing the smelting charge that passes through the feed ports to pile upon the floor and against a plate which forms the outside of the furnace. For further advantages of this invention I refer to application No. 352,468, series of 1900, filed by me January 15th, 1907, and eventuating into Patent, Number 1,149,495, of Aug. 10, 1915, of which this is a divisional application for Letters Patent.

The invention is further described by reference to the accompanying drawings: Figure 1, is a cross section of the furnace showing ports through which the material is fed into the furnace and the manner that the charge protects the masonry of the side walls by forming the embankment C. upon the floor and along the walls. Fig. 2 shows the charge in the furnace resting upon the floor against a steel plate and the water cooled blocks through which the charge has dropped together with the brackets supporting the roof. Fig. 3 is a detail of the roof. Fig. 4 shows the port lowered below the skew bricks which makes the roof stronger by piercing the walls with the ports instead of the arch when the roof is supported upon masonry instead of brackets. Like letters refer to like parts in all figures.

In all figures A. is the roof of the furnace. B. is the ports or passages through which the material is fed into the furnace. C. is the material within the furnace fed through the feed ports, E. are brackets supporting the roof, and F. are water cooled blocks. G. are plates supporting the smelting, or refractory charge.

Having thus fully described my invention what I claim as new and desire to secure by Letters Patent is:—

1. In a furnace roof for open-hearth and reverberatory furnaces, having charging ports around the outer edges thereof; said ports being made of metal cooling blocks that serve the purposes of protecting said roofs from the scorification of materials fed through said ports, and stresses caused by varying temperatures within said furnaces.

2. The method of protecting the walls of an open hearth or reverberatory furnace which consists in feeding the ores or fettling materials into the furnace chamber near the upper part thereof, and in causing the same to form a sloping embankment resting upon the floor of the furnace chamber and along the walls within the chamber between the bath and walls.

3. In an open hearth or reverberatory furnace, a floor, walls extending upwardly from the floor, and feeding ports leading into the upper part of the furnace chamber and being so located that the ores or fettling materials entering therethrough may have unrestricted vertical movement downwardly to the said floor near the walls and may form sloping embankments against the walls to protect the latter from the heat and corrosive action of the metal bath.

GEORGE CAMPBELL CARSON.

Witnesses:
   THOS. S. CHRISTENSEN,
   ED. COLE.

DISCLAIMER.

1,302,307.—*George Campbell Carson*, San Francisco, Calif. CONSTRUCTION OF ROOF OF OPEN-HEARTH AND REVERBERATORY FURNACES. Patent dated April 29, 1919. Disclaimer filed March 29, 1922, by the patentee.

Hereby make disclaimer of the following parts of the claims and specification of said Letters Patent No. 1,302,307, and which your petitioner accordingly desires to erase, viz:

(1) The words "or fettling materials" in claim two (2) at the end of line 84 and beginning of line 85.

(2) The words "or fettling materials" in claim three (3) at the end of line 95 and beginning of line 96.

(3) The words "or refractory" at the end of line 69 and beginning of line 70 of the specification.

All of which is without prejudice to residue left after expunging the above specified words.

[*Official Gazette April 11, 1922.*]

DISCLAIMER.

1,302,307.—*George Campbell Carson*, San Francisco, Calif. CONSTRUCTION OF ROOF OF OPEN-HEARTH AND REVERBERATORY FURNACES. Patent dated April 29, 1919. Disclaimer filed September 15, 1922, by the patentee.

Hereby makes disclaimer to such interpretation of the word "ores," which appears in claims two (2) and three (3) of said Letters Patent as would make it include silica or silicious ores used as fettling material, said word "ores" to have its usual accepted meaning of smelting ores.

[*Official Gazette September 26, 1922.*]